Patented May 20, 1941

2,242,469

UNITED STATES PATENT OFFICE 2,242,469

DYESTUFFS OF THE PHTHALOCYANINE SERIES

Hans Hoyer, Leverkusen-I. G. Werk, Rudolf Schröter, Leverkusen-Schlebusch, and Heinrich Rinke, Leverkusen-Kuppersteg, Germany, assignors to General Aniline & Film Corporation, a corporation of Delaware No Drawing. Application June 13, 1938, Serial No. 213,458. In Germany June 1, 1937

2 Claims. (Cl. 260—314)

The present invention relates to new substantive dyestuffs of the phthalocyanine series.

The compounds which are prepared in accordance with our present invention may be defined as phthalocyanines of the benzene series at least one of the benzene nuclei of which is substituted by one carboxylic acid group and one phenyl group. These compounds are characterized by their being capable of directly dyeing cellulosic materials such as cotton, viscose or cuprammonium silk, paper and the like. They show very clear green shades and are distinguished by excellent fastness properties. They are further-more capable of being converted into valuable lake dyestuffs by neutralizing the same, for instance by means of alkaline earth metals, the pigments thus obtained showing also extremely good fastness properties. Particular importance is attached to the copper containing dyestuffs as they show the clearest shade.

Our new dyestuffs can be prepared by starting from such diphenyls as contain in one of the benzene nuclei three carboxylic acid groups, at least two of which are in o-position to each other, and heating the same in a manner known per se with a metal salt and urea, preferably in the presence of catalysts such as boric acid and/or salts of an acid $H_2XO_4$ wherein X stands for an element of the fifth group of the periodic system. The starting materials as well as the final products may contain various substituents without departing from the scope of the present invention. Thus, they may contain chlorine atoms, alkyl-, or alkoxy groups in those benzene nuclei, which are free from the carboxylic acid groups. The said starting materials can also be applied in admixture with other starting materials known to be capable of forming phthalocyanines, the dyestuffs thus formed containing different substituents in the molecule. Thus, there can be employed mixtures of diphenyl-tricarboxylic acids of the character described with aromatic o-dicarboxylic acids, for instance diphenyl-o-dicarboxylic acids. In this case there are obtained phthalocyanines containing less than 4, for instance two carboxylic acid groups. The solubility of the resulting dyestuffs can be varied by subjecting them either to a decarboxylating or sulfonating process.

As suitable starting material for the new dyestuffs there may be mentioned the 1-phenylbenzene-2.4.5-tricarboxylic acid which can be obtained by the action of 2.3-dimethylbutadiene on cinnamic acid followed by dehydrogenation and oxidation according to the following scheme:

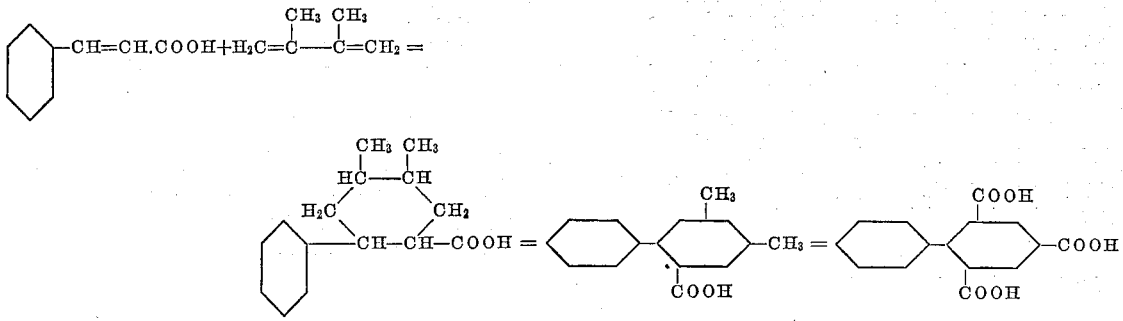

The following examples illustrate the present invention without, however, restricting it thereto the parts being by weight:

Example 1

To a mixture of 100 parts of 1-phenyl-2.4.5-benzene tricarboxylic acid and 300 parts of urea there are added at 150° C. 25 parts of copper chloride, 1 part of ammonium molybdate and 1 part of boric acid. The reaction mixture is then heated to 200° C. and kept at this temperature until the formation of the dyestuff is complete. After cooling the melt is dissolved in hot dilute caustic soda lye and freed from the precipitated copper oxide by filtration, whereupon the tetraphenyl copper phthalocyanine tetracarboxylic acid is precipitated by acidification, filtered, washed until neutral and dried. The dyestuff thus obtained represents a green powder with a metallic lustre which is easily soluble in aqueous alkalies and dyes cellulose containing materials such as cotton, viscose or copper silk in vivid yellowish-green shades. The tetraphenyl-copper phthalocyanine tetracarboxylic acid yields insoluble metal salts when treated with calcium or barium salts and the like, and may be used in this form on a suitable substrate such as aluminium oxide hydrate and the like as pigments.

Example 2

5 parts of 4'-chlorodiphenyl-2.4.5-tricarboxylic acid and 15 parts of urea are heated for ½ hour to 150°. Thereupon 1 part of anhydrous copper chloride, 0.1 part of ammonium molybdate are added and the reaction mixture is heated to 180–190°, until the formation of the dyestuff is complete. The melt is then boiled out with dilute hydrochloric acid, the remaining dyestuff which represents a green powder being sucked off and dried. The alkali metal salt of the tetrachlorophenyl copper phthalocyanine tetracarboxylic acid thus obtained dyes cotton or any other cellulose containing material in brilliant green shades.

Example 3

5 parts of 4'-methoxydiphenyl-2.4.5-tricarboxylic acid and 15 parts of urea are heated for ½ hour to 150–160°; thereupon 1 part of anhydrous copper chloride and 0.1 part of ammonium molybdate are added and the whole is heated to 180–190°. After several hours the melt is extracted with boiling dilute hydrochloric acid and the tetra methoxyphenyl copper phthalocyanine tetracarboxylic acid is sucked off. The dyestuff dyes cellulose containing materials such as cotton from an alkaline solution brilliant yellowish-green shades.

Example 4

5 parts of 2'-chlorodiphenyl-2.4.5-tricarboxylic acid and 15 parts of urea are heated for ½ hour to 150–160°; thereupon a mixture of 1 part of anhydrous copper chloride, and 0.1 part of ammonium molybdate is added and the whole is heated to 180–190° until the formation of the dyestuff is complete. The melt is then digested with hot hydrochloric acid and the tetrachlorophenyl copper phthalocyanine tetracarboxylic acid is sucked off. The dyestuff thus obtained dyes cotton in bluish-green shades.

Example 5

An intimate mixture of

|   | Parts |
|---|---|
| Diphenyl-2.4.5-tricarboxylic acid | 10 |
| Urea | 30 |
| Nickel chloride | 2 |
| Ammonium molybdate | 0.4 | is heated to 180–190° until the reaction mixture is completely converted into the phthalocyanine dyestuff. Then the crude product is digested with hot dilute hydrochloric acid to remove the excess of nickel chloride, sucked off, washed until neutral and dried. The dyestuff thus obtained is easily soluble in aqueous alkali and yields on cotton and the like bright green shades of extremely good fastness.

In the naming of the products of our process it should be noted that the numbering of the positions substituted by the phenyl and carboxy groups does not correspond with the same numbered positions in that diphenyl-2.4.5-tricarboxylic acid starting material. The 4 and 5 carbon atoms of the starting material carrying the ortho-carboxylic acid groups form a part of the pyrrole ring of the isoindole nuclei of the phthalocyanine molecule, whereas the 4 and 5 positions of the phthalocyanine molecule are the outside carbon atoms, which may be referred to as the para positions and which carry substitutable hydrogen. This system of naming substituted phthalocyanines has been used by Miles A. Dahlen in his article, "The phthalocyanines," Industrial and Engineering Chemistry, vol. 31 (1939), pages 839–847. It is used in the appended claims to designate the positions of attachment of the carboxylic acid and phenyl group.

As used herein, the term phthalocyanines of the benzene series refers to those phthalocyanines in which the porphyrazine ring is substituted only by benzo radicals.

We claim:

1. A phthalocyanine of the group consisting of copper and nickel phthalocyanines of the benzene series, each of the benzene nuclei of which is substituted in its 4 and 5 positions by a carboxylic acid group and a phenyl group.

2. A copper phthalocyanine of the benzene series, each of the benzene nuclei of which is substituted in its 4 and 5 positions by carboxylic acid and phenyl groups.

HANS HOYER.
RUDOLF SCHRÖTER.
HEINRICH RINKE.